US010091759B2

United States Patent
Lin et al.

(10) Patent No.: US 10,091,759 B2
(45) Date of Patent: Oct. 2, 2018

(54) MOBILITY MANAGEMENT METHOD IN MACRO-ASSISTED SYSTEM AND RELATED APPARATUSES USING THE SAME

(71) Applicants: National Taiwan University, Taipei (TW); MediaTek Inc., Hsinchu (TW)

(72) Inventors: Kuang-Hsun Lin, Taipei (TW); Hung-Yu Wei, Taipei (TW)

(73) Assignees: National Taiwan University, Taipei (TW); MediaTek Inc., Hsinchu (TW)

( * ) Notice: Subject to any disclaimer, the term of this patent is extended or adjusted under 35 U.S.C. 154(b) by 0 days.

(21) Appl. No.: 15/597,156

(22) Filed: May 17, 2017

(65) Prior Publication Data
US 2017/0339662 A1  Nov. 23, 2017

Related U.S. Application Data

(60) Provisional application No. 62/339,185, filed on May 20, 2016.

(51) Int. Cl.
*H04W 36/30* (2009.01)
*H04W 64/00* (2009.01)
(Continued)

(52) U.S. Cl.
CPC ........ *H04W 64/006* (2013.01); *H04B 17/309* (2015.01); *H04W 24/10* (2013.01);
(Continued)

(58) Field of Classification Search
CPC .... H04B 17/309; H04W 16/32; H04W 24/10; H04W 36/0061; H04W 48/16; H04W 64/006; H04W 72/0446
(Continued)

(56) References Cited

U.S. PATENT DOCUMENTS

2012/0320874 A1  12/2012  Li et al.
2013/0195042 A1  8/2013  Taori et al.
(Continued)

FOREIGN PATENT DOCUMENTS

EP        2833670       2/2015
WO     2016053426       4/2016

OTHER PUBLICATIONS

Jeong et al., "Random Access in Millimeter-Wave Beamforming Cellular Networks: Issues and Approaches," IEEE Communications Magazine, Jan. 2015, pp. 180-185.
(Continued)

*Primary Examiner* — Nathan Taylor
(74) *Attorney, Agent, or Firm* — JCIPRNET

(57) ABSTRACT

The disclosure is directed to a mobility management method in a macro-assisted communication system and related apparatuses using the same method. According to one of the exemplary embodiments, the disclosure is directed to a mobility management method applicable to a user equipment in a macro-assisted communication system. The method would include not limited to: measuring a beam quality of a first wireless connection; receiving a preamble in response to the beam quality being below a threshold; performing a beam search on a random access channel in response to receiving the preamble; transmitting a measurement report which comprises a result of the beam search; and receiving a handover information from the first wireless connection to a second wireless connection in response to transmitting the measurement report.

9 Claims, 14 Drawing Sheets

(51) Int. Cl.
  *H04B 17/309* (2015.01)
  *H04W 24/10* (2009.01)
  *H04W 48/16* (2009.01)
  *H04W 72/04* (2009.01)
  *H04W 36/00* (2009.01)
  *H04W 16/32* (2009.01)

(52) U.S. Cl.
  CPC ....... *H04W 36/0061* (2013.01); *H04W 48/16* (2013.01); *H04W 72/0446* (2013.01); *H04W 16/32* (2013.01)

(58) Field of Classification Search
  USPC .................................................. 455/436–444
  See application file for complete search history.

(56) References Cited

U.S. PATENT DOCUMENTS

| | | | |
|---|---|---|---|
| 2014/0073337 A1 | 3/2014 | Hong et al. | |
| 2014/0153423 A1* | 6/2014 | Shin | H04W 36/18 370/252 |
| 2015/0351135 A1 | 12/2015 | Schmidt et al. | |
| 2016/0007261 A1 | 1/2016 | Oh et al. | |
| 2016/0142189 A1 | 5/2016 | Shin et al. | |
| 2017/0181134 A1* | 6/2017 | Niu | H04W 72/042 |
| 2017/0207845 A1* | 7/2017 | Moon | H04B 7/088 |
| 2018/0019901 A1* | 1/2018 | Choi | H04L 27/26 |

OTHER PUBLICATIONS

3GPP TS 36.300 V14.1.0 (Dec. 2016), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 14), pp. 1-317.

3GPP TS 36.331 V14.1.0 (Dec. 2016), 3rd Generation Partnership Project; Technical Specification Group Radio Access Network; Evolved Universal Terrestrial Radio Access (E-UTRA); Radio Resource Control (RRC); Protocol specification (Release 14), pp. 1-653.

Giordani et al., "Multi-Connectivity in 5G mmWave Cellular Networks", retrieved from https://arxiv.org/pdf/1605.00105v1.pdf, Apr. 30, 2016, pp. 1-7.

"Office Action of Taiwan Counterpart Application", dated Jul. 30, 2018, p. 1-p. 9.

* cited by examiner

MOBILITY MANAGEMENT METHOD IN MACRO-ASSISTED SYSTEM AND RELATED APPARATUSES USING THE SAME

CROSS REFERENCE TO RELATED APPLICATION

This application claims the priority benefit of U.S.A. provisional application Ser. No. 62/339,185, filed on May 20, 2016. The entirety of the above-mentioned patent application is hereby incorporated by reference herein and made a part of specification.

TECHNICAL FIELD

The disclosure is directed to a mobility management method in a macro-assisted communication system and related apparatuses using the same method.

BACKGROUND

For a Macro-assisted system, conventionally, communication between a mobile station (MS) and a secondary base station (BS) is arranged by a link between the MS and a Macro BS. In this disclosure, MS is synonymous with user equipment (UE). In a Macro-assisted system, dual connectivity could be implemented in order to offload communications between a Macro BS and UEs to a secondary BS. Dual connectivity refers to a mobile station which simultaneously establishes two or more radio links to at least two base stations. FIG. 1 illustrates an example of a Macro-assisted system which adopts the above described dual connectivity scheme. In this example, a UE 103 would wirelessly establish a first link with the Macro BS 101 and wirelessly establish a second link with the secondary BS 102. The Macro BS 101 and the secondary BS 102 would establish communication via a backhaul link. In this way, data traffic between the Macro BS 101 and the MS 103 could be offloaded to the link between the MS 103 and the secondary BS 102 and also the backhaul link between the Macro BS 101 and the secondary BS 102.

The communication system in the future such as the upcoming 5G cellular communication system may gravitate toward a millimeter wave (mmWave) communication system which may operate above 30 GHz. Typically, an electromagnetic wave which operates above 30 GHz would experience severe pathloss and thus an antenna array that transmits a directional radiation pattern would be needed to implement directional transmissions. Similarly, a centimeter wave (cmWave) communication system may also operate within a directional transmission framework in the future.

For the above described directional communication system, dual connectivity could be implemented. For example, a Macro BS may entirely or partially implement omni-directional transmissions to accomplish configurations through control signaling in cmWave frequency or mmWave frequency; whereas, the secondary BS may implement directional transmission in mmWave frequency. FIG. 2 illustrates such an example as a Macro BS 201 has omni-directional transmission in cmWave frequency and directional transmission in mmWave frequency to cover a vehicle 202, a cell phone 203, and a D2D communication group 204 in which a secondary BS may or may not be used to implement directional transmission in mmWave frequency.

However, currently, assuming that there are multiple secondary BSs in the vicinity of a MS, the exact mechanism for a MS to search for an optimal secondary BS and to connect to the secondary BS is not yet known. FIG. 3 illustrates a hypothetical scenario in which a UE conducting a search among multiple candidate secondary BSs. In dual-connectivity system, a UE may search for one or more candidate secondary BSs for data transmission under the control signaling of a master (Macro) base station. Assuming that the UE has the capability for directional transmission and has at least four directions, which are 0, 90, 180, and 270 degrees, the best secondary BS which the UE may connect to would be based on different factors such as locations of the secondary BSs, which secondary BS has the best signal, the channel measurements, and etc. Also, what is considered the best secondary BS may change when the UE changes location, changes directional orientation, changes directional configuration, and other factors. Since currently the exact mechanism for a user device to discover the best secondary BS under the circumstance of connecting under a specific beam directional configuration is unknown, a method and related devices to discover a best secondary BS among a group of secondary BSs and subsequently to connect the best secondary BS could be needed.

SUMMARY OF THE DISCLOSURE

Accordingly, the disclosure is directed to a mobility management method in a macro-assisted communication system and related apparatuses using the same method.

In one of the exemplary embodiments, the disclosure is directed to a mobility management method applicable to a user equipment in a macro-assisted communication system. The method would include not limited to: measuring a beam quality of a first wireless connection; receiving a preamble in response to the beam quality being below a threshold; performing a beam search on a random access channel in response to receiving the preamble; transmitting a measurement report which comprises a result of the beam search; and receiving a handover information from the first wireless connection to a second wireless connection in response to transmitting the measurement report.

In one of the exemplary embodiments, the disclosure is directed to a mobility management method applicable to a base station in a macro-assisted communication system. The method would include not limited to: receiving a search request; performing a beam search on a random access channel in response to receiving the search request; transmitting a measurement report which would include a result of the beam search; and receiving a handover information in response to transmitting the measurement report.

In one of the exemplary embodiments, the disclosure is directed to a user equipment which would include not limited to: a transmitter; a receiver; and a processor coupled to the transmitter and the receiver and configured to: measure a beam quality of a first wireless connection; receive, via the receiver, a preamble in response to the beam quality being below a threshold; perform, via the receiver, a beam search on a random access channel in response to receiving the preamble; transmit, via the transmitter, a measurement report which includes a result of the beam search; and receive, via the receiver, a handover information from the first wireless connection to a second wireless connection in response to transmitting the measurement report.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
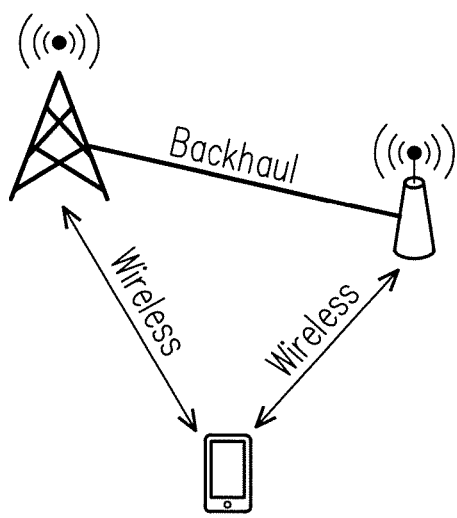
FIG. 1 illustrates an example of a Macro-assisted system which adopts the above described dual connectivity scheme.
Figure 2:
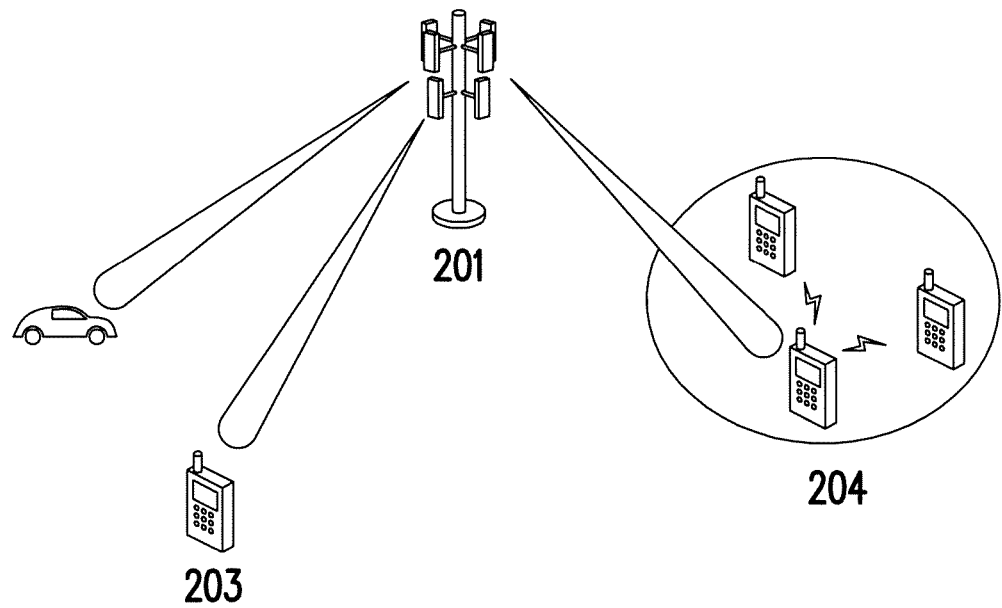
FIG. 2 illustrates a Macro BS communicating with various UEs or UE groups by using directional transmissions.
Figure 3:
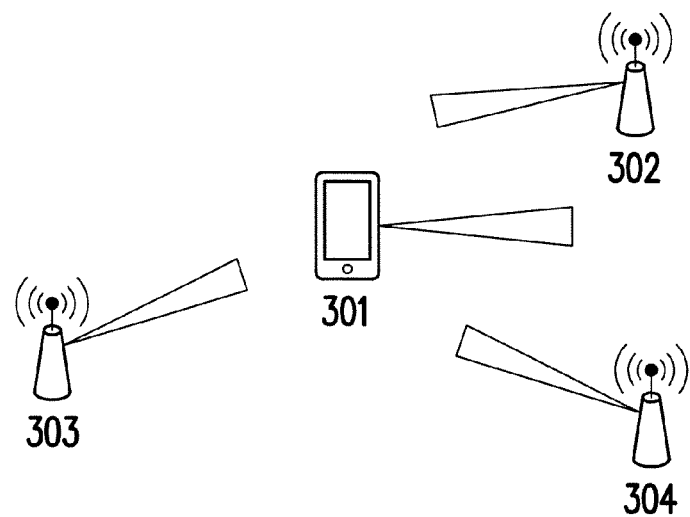
FIG. 3 illustrates a hypothetical scenario in which a UE conducting a search among multiple candidate secondary BSs.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a mobility management method applicable to a macro-assisted system that uses a dual-connectivity architecture that entirely or partially operates in the mmWave frequency. The disclosure provides a mechanism for a directional link searching which could be used in mmWave cell. The mechanism includes link maintenance of directional beams and would involve beam training or beam track during an initial access or during radio link recovery. The provided mobility management method would include conducting a cell search among a plurality of secondary base stations and establishing an optimal connection in a wireless communication system that uses directional beam transmissions. The provided mobility management method also includes signaling mechanism for performing a handover which could be coordinated by a master base station. The signaling for configuration may trigger a UL beam searching sequence transmission. The sequence could be a random access preamble which is transmitted in random access physical resources.

Figure 4A:
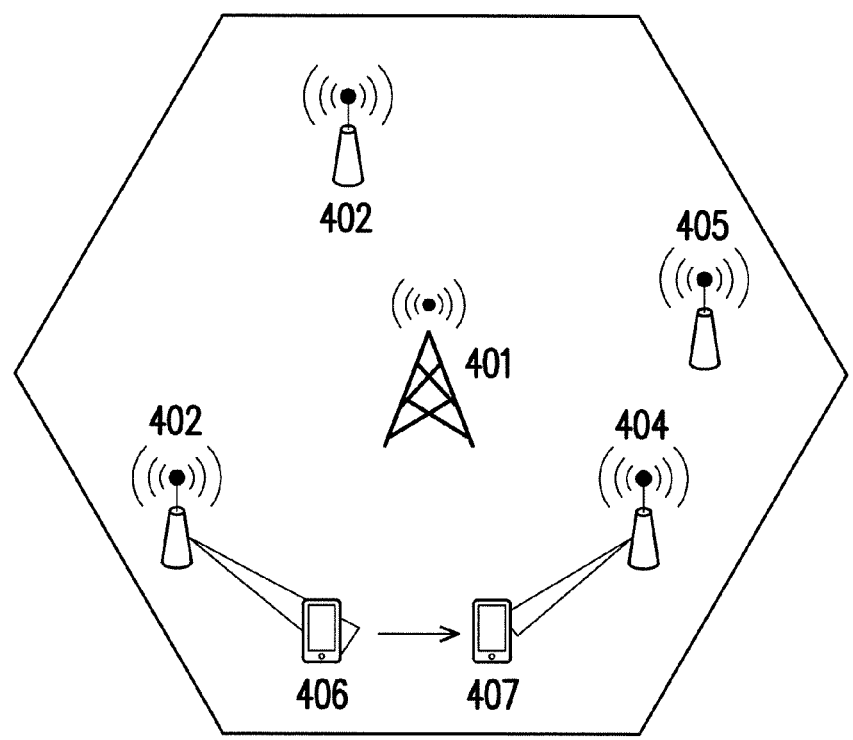
FIG. 4A illustrates an example of a Macro-assisted system in accordance with one of the exemplary embodiments of the disclosure.

FIG. 4A illustrates an example of a Macro-assisted system in accordance with one of the exemplary embodiments of the disclosure. The Macro-assisted system of FIG. 4A may include a Macro (master) BS 401, one or more secondary BSs (SBSs) 402 403 404 405, and one or more UEs 406 407. The Macro BS 401 would coordinate the secondary BSs 402 403 404 405 and UEs 406 407 to help the UEs 406 407 to find a best SBS as well as optimal transmit-receive beam configurations. For example, the Macro BS 401 may assist the UE 406 to find the secondary BS 403 as the optimal second BS and may also assist the UE 407 to find the secondary BS 404 as the optimal second BS. In this example, the Macro BS 401 could be a legacy BS that uses a Long Term Evolution (LTE) or LTE advanced (LTE-A) standard while one or more of the secondary BSs 402 403 404 405 may operate in the mmWave frequency. Also in this example, the UEs are assumed to operate in dual connectivity with both the Macro BS 401 and at least one of the secondary BSs 402 403 404 405.

Figure 4B:
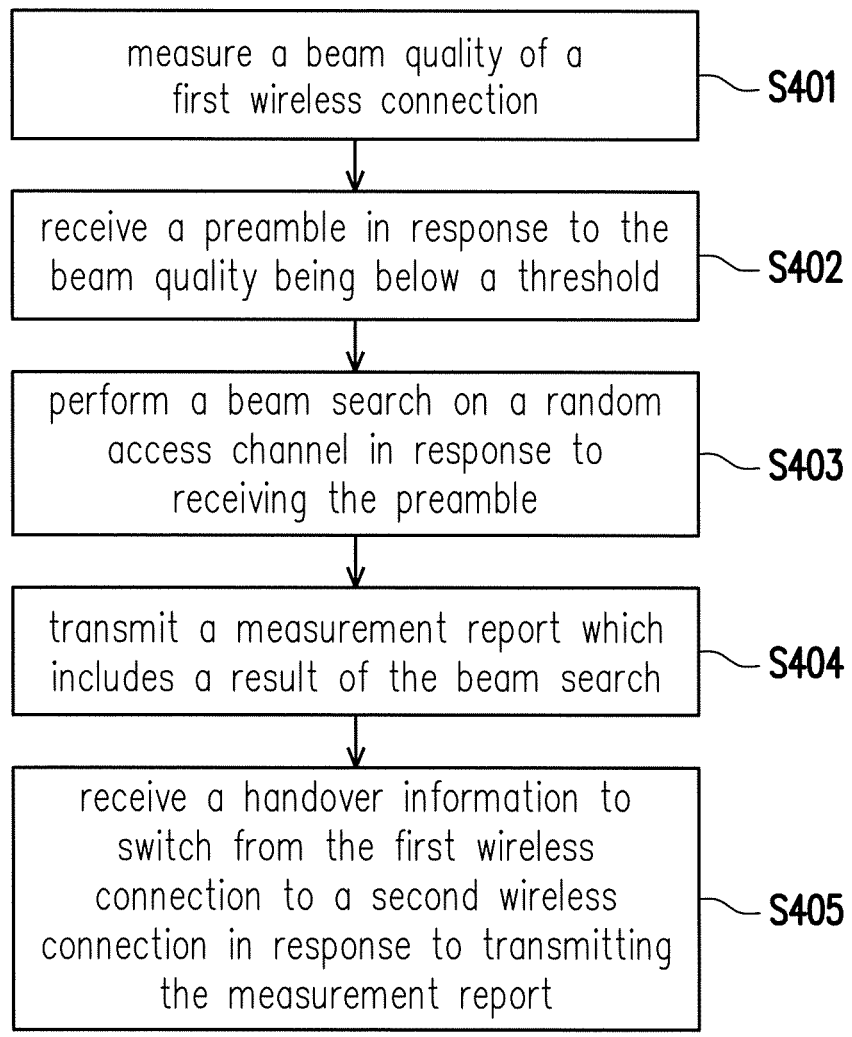
FIG. 4B illustrates a mobility management method from the perspective of a base station in a macro-assisted communication system in accordance with one of the exemplary embodiments of the disclosure.

FIG. 4B illustrates a mobility management method from the perspective of a user equipment in a macro-assisted communication system in accordance with one of the exemplary embodiments of the disclosure. In step S401, the user equipment would measure a beam quality of a first wireless connection. The beam quality could be defined in terms of but not limited to one or more a quality of service (QoS) parameters or a signal to noise ratio (SNR) or signal to interference plus noise ratio (SINR) or other measurement definitions. The first wireless connection could be a previously established connection with a secondary base station. In step S402, the user equipment receive a preamble in response to the beam quality being below a predetermined threshold. The preamble could be one of a random access preamble which his known by the UE. In step S403, the user equipment would perform a beam search on a random access channel in response to receiving the preamble. The beam search could be performed by measuring the beam quality of a particular beam. In step S404, the user equipment would transmit a measurement report which includes a result of the beam search. In step S405, the user equipment would receive a handover information to switch from the first wireless connection to a second wireless connection in response to transmitting the measurement report.

According to one of the exemplary embodiments, for accomplishing SBS addition, the mechanism of receiving the connection change information for the first wireless connection may include receiving a connection reconfiguration message which may include a beam identification (ID) and a secondary base station ID and adding a second wireless connection with a secondary base station which corresponds to the secondary base station ID.

According to one of the exemplary embodiments, for accomplishing SBS change, the mechanism of receiving the connection change information for the first wireless connection may include receiving a connection reconfiguration message which would include a beam identification (ID) and a secondary base station ID, adding a second wireless connection with a secondary base station which corresponds to the secondary base station ID, and severing the first wireless connection.

According to one of the exemplary embodiments, for accomplishing SBS release, the mechanism of receiving the connection change information for the first wireless connection may include receiving a connection reconfiguration message, severing the first wireless connection in response to receiving the connection reconfiguration message, and configuring a cellular connection with a macro cell base station.

According to one of the exemplary embodiments, for accomplishing beam modification, receiving the connection change information for the first wireless connection may include receiving a connection reconfiguration message which includes a beam identification (ID) and a secondary base station ID which is a current serving secondary base station ID, and changing the first wireless connection to have another beam configuration which is based on the beam ID.

According to one of the exemplary embodiments, before measuring the beam quality of the first wireless connection, the disclosed method may further include receiving a small cell base station (SBS) searching configuration message which may include a duration parameter of T timeslots and performing a beam search of a SBS over the T timeslots in response to receiving the SBS searching configuration message. Further, the proposed method may include performing a signal quality measurement for each SBS beam ID over the T timeslots and transmitting a scan beam having a different UE beam ID over each time slot of the T timeslots.

Moreover, the small cell base station searching configuration message may further include one or a combination of a starting time information of performing the signal quality measurement, an ending time information of performing the signal quality measurement, and a plurality of time point information of performing the signal quality measurement. The above described first wireless connection and the second wireless connection would be in the millimeter wave frequency range, and also a third wireless connection which operates in a radio frequency (RF) range could be established with a macro cell base station.

Figure 4C:
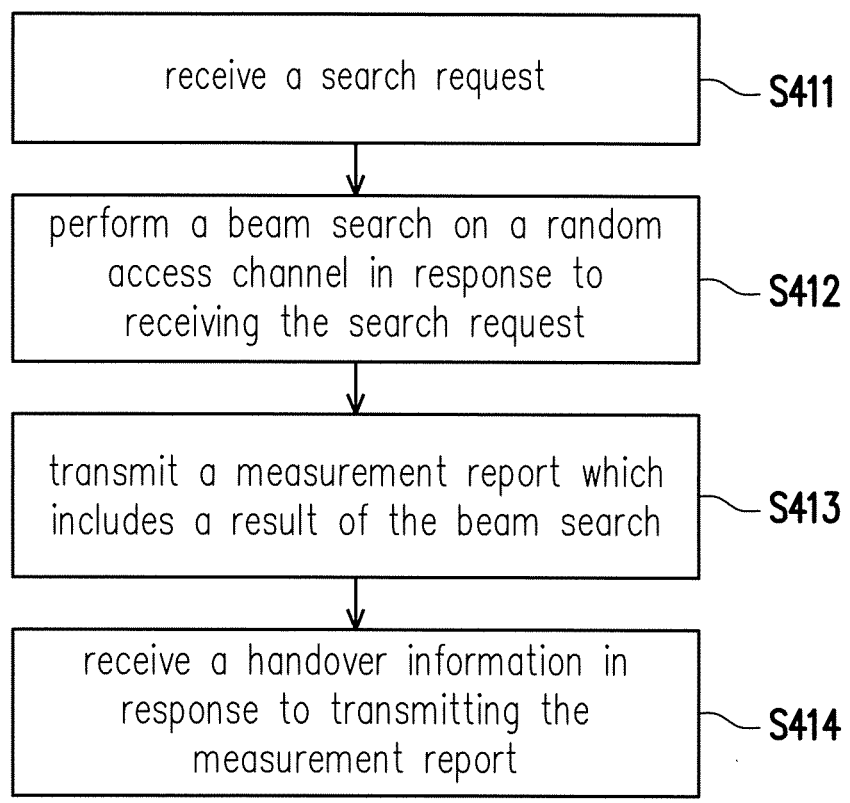
FIG. 4C illustrates a mobility management method from the perspective of a user equipment in a macro-assisted communication system in accordance with one of the exemplary embodiments of the disclosure.

FIG. 4C illustrates a mobility management method from the perspective of a base station in a macro-assisted communication system in accordance with one of the exemplary embodiments of the disclosure. In step S411, the base station may receive a search request. The search request could be received from a Macro base station to search for a particular user equipment. In step S412, the base station would perform a beam search on a random access channel in response to receiving the search request. In step S413, the base station would transmit a measurement report which includes a result of the beam search. In step 414, the base station would receive a handover information in response to transmitting the measurement report.

According to one of the exemplary embodiments, if the above described base station is a SBS, the above described mobility management method further may further include establishing a first wireless connection at least by: receiving a SBS searching request, transmitting a SBS searching acknowledgment, performing a signal quality measurement of a beam, and recording and transmitting a report which may include the signal quality measurement. Further, receiving the search request could be in response to a signal quality of the first wireless being below a predetermined threshold.

The above described SBS search request may include one or a combination of: a duration for performing a plurality of signal quality measurements, a starting time for performing the plurality of signal quality measurements, an ending time for performing the plurality of signal quality measurements, and a list of time points for performing the plurality of signal quality measurements.

According to one of the exemplary embodiments, for accomplishing SBS release, the mechanism of receiving the connection change information may include receiving a connection release message to sever a first wireless connection. Also for accomplishing beam modification, receiving the connection change information may include receiving a SBS selected message including a SBS identification (ID) which is the same as the serving SBS, receiving a user equipment (UE) beam ID, and receiving from a beam which corresponds to the UE beam ID.

According to one of the exemplary embodiments, for accomplishing SBS addition, receiving the connection change information may include receiving a SBS selected message which may include a UE beam ID and establishing a second wireless connection by using the UE beam ID. For SBS change, receiving the connection change information may include receiving a SBS selected message which includes a UE beam ID, receiving a handover information in response to receiving the SBS selected message, and establishing a second wireless connection by using handover information and the UE beam ID.

Furthermore, the above described base station could be a secondary base station which receives the search request in a radio frequency (RF) and performs the signal quality measurement of the beam in a millimeter wave (mmWave) frequency.

Figure 4D:
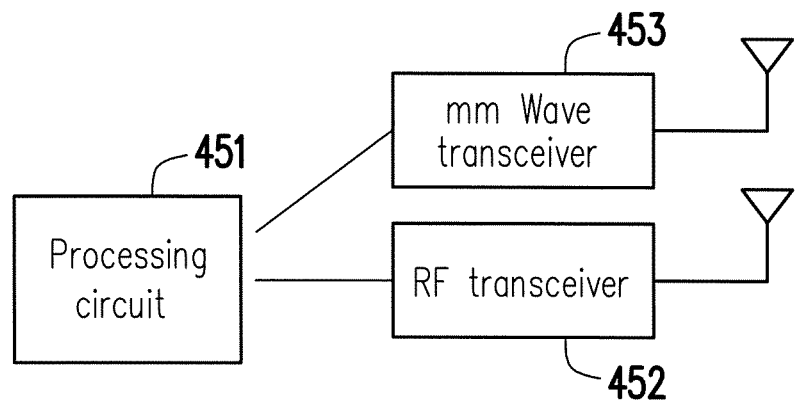
FIG. 4D illustrates the hardware of a base station in terms of functional block diagrams in accordance with one of the exemplary embodiment of the disclosure.

FIG. 4D illustrates the hardware of a user equipment (UE) in terms of functional block diagrams in accordance with one of the exemplary embodiment of the disclosure. The UE may include not limited to a processing circuit (or processor) 451 electrically coupled to an mmWave transceiver 453 and a RF transceiver 452. The mmWave transceiver 453 may include an mmWave transmitter and an mmWave receiver for transmitting and receiving wireless signals in the mmWave spectrum. The RF transceiver 2003 may include a RF transmitter and a RF receiver for transmitting and receiving wireless signals in the 3G/4G/LTE spectrums. The UE may further include a Wi-Fi transceiver and/or a Bluetooth transceiver (not shown). The processing circuit 451 would be used to implement the mobility management method used by a UE as shown in FIG. 4B as well as other disclosed exemplary embodiments of the disclosure. The processing circuit 451 may include one or more central processing unit (CPU), microcontroller units (MCU), or other types of programmable integrated circuits (ICs). Alternatively the processing circuit 451 may also be one or more independent ICs.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a moving environment, such as a bus, a train, an airplane, a boat, a car, and so forth.

Figure 4E:
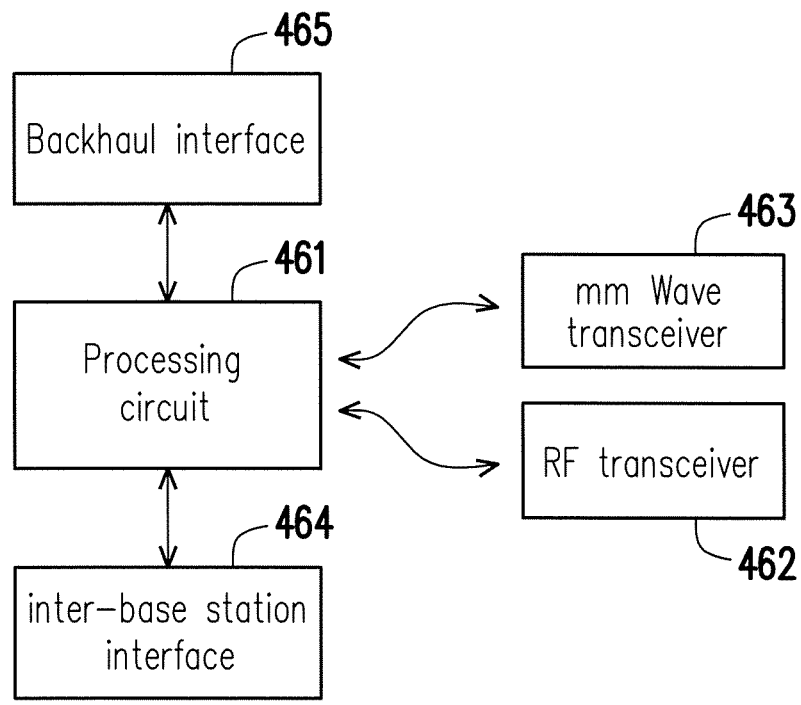
FIG. 4E illustrates the hardware of a use equipment in terms of functional block diagrams in accordance with one of the exemplary embodiment of the disclosure.

FIG. 4E illustrates the hardware of a base station in terms of functional block diagrams in accordance with one of the exemplary embodiment of the disclosure. The base station may include not limited to a processing circuit 461 electrically coupled to a back haul transceiver interface 465, an inter-base station interface 464, an mmWave transceiver 463, and a RF transceiver 462. The back haul transceiver interface 465 could be hardware circuit configured to communicate with another network node or an apparatus in the core network according to a back haul standard such as the X2 interface. The inter-base station interface 464 could be hardware circuit configured to communicate with another base station such as an S1 interface. The inter-base station interface 464 could be used to communicate with a Macro base station. The mmWave transceiver 463 may include an mmWave transmitter and a mmWave receiver for transmitting and receiving wireless signals in the mmWave spectrum. The RF transceiver 462 may include a RF transmitter and a RF receiver for transmitting and receiving wireless signals in the 3G/4G/LTE spectrums. The processing circuit 465 would be used to implement the proposed scheduling method used by a base station that transmits directional reference signals. The processing circuit 465 may include one or more central processing unit (CPU), microcontroller units (MCU), or other types of programmable integrated circuits. Alternatively the processing circuit 451 may also be one or more independent ICs. The base station in FIG. 4E could be a secondary base station which could be a small cell base station, an access point, a hotspot, a remote radio head, a transmission and reception point (TRP), and so forth.

To further elucidates the above described concepts described by FIG. 4A~FIG. 4E and their corresponding written descriptions, the disclosures provides several exemplary embodiments as disclosed in FIG. 5~FIG. 9E as well as their corresponding written descriptions. The disclosed mobility management method would involve two stages— The first stage involves Macro-assisted searching of an optimal secondary BS, and the second stage involves an addition, a change, and/or a release of secondary BS. In these exemplary embodiments, all base stations are assumed to undergo time synchronization, and the beamforming could either be analog beam form and/or digital beam forming.

Figure 5:
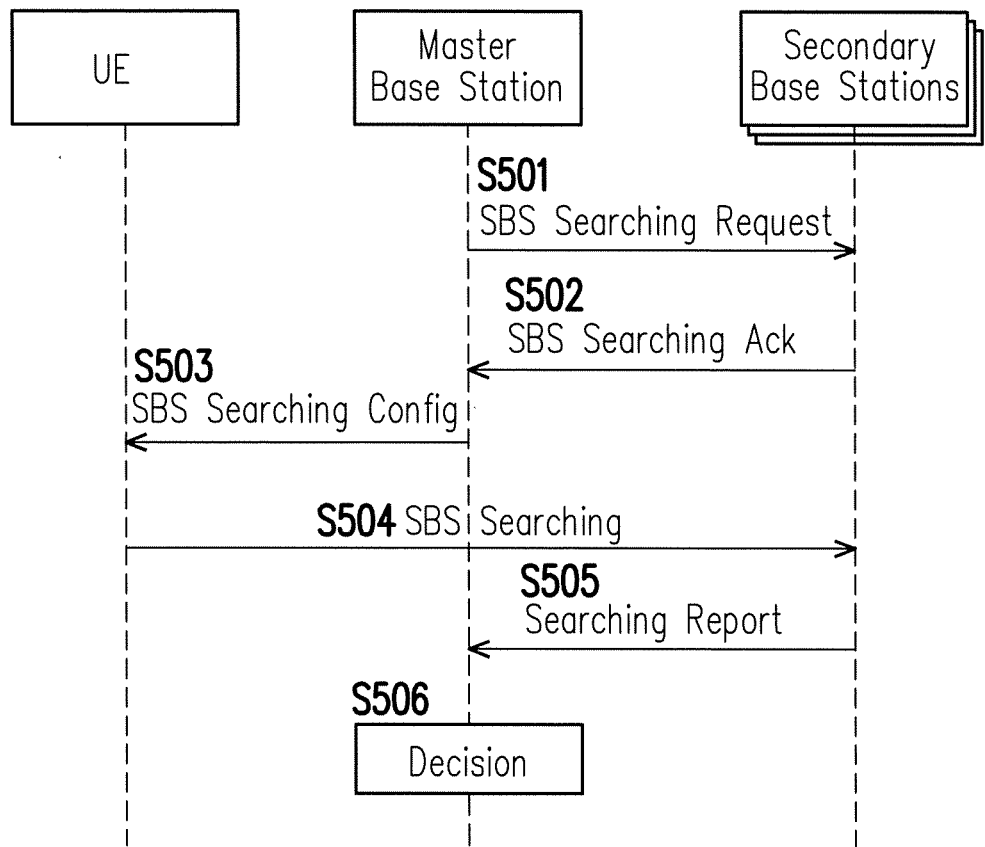
FIG. 5 illustrates a signal diagram of a first stage of the mobility management method in accordance with one of the exemplary embodiment of the disclosure.

FIG. 5 illustrates a signal diagram of a first stage of the mobility management method in accordance with one of the exemplary embodiment of the disclosure. In step S501, a Macro (master) BS would transmit a SBS searching request to each of the one or more secondary BSs. The SBS searching requests transmitted to the one or more secondary BSs could be pre-clustered or selected by the Macro BS. Each SBS search request may include one or more of the following not limited to: timing information for beam search opportunities and the total duration for one iteration of beam searching (T). The timing information could be in terms of a frame number, a subframe, or other types of number to describe time units. According to one exemplary embodiment, T=M×N time slots as T is the duration needed to perform one iteration of beam scanning. M represents the number of possible antenna beam configurations in the base station in the angular domain. N represents the number of possible antenna beam configurations in the UE in the angular domain. Alternatively, T=M as the UE does not have to use beamforming and thus operate with omnidirectional transmissions. Alternatively, T=N as the BS does not have to use beamforming and thus operate with omnidirectional transmissions. Alternatively, the beam scanning may include a subset of possible configurations and thus T=M'×N' in which M'<M and N'<N. The beam search method could be individually selected by the SBS or assigned by MBS. The beam search method may involve knowing the type of beam configuration and be chosen according to different type of beam configurations. In step S502, the SBS would transmit either an acknowledge character (ACK) or non-acknowledge character (NACK) to the master base station.

In step S503, the Macro BS would transmit to a UE a SBS Searching Configuration message which may include one or more of the following information not limited to: a time to start coordinated beam searching, a timing for performing beam searching, one or more assigned beam search sequences, and physical resources for UEs to perform the beam searching. The timing for performing beam searching may include one or more of the following information not limited to: the total duration for one iteration of beam searching (T), a starting time of beam searching, an ending time of beam search, and a list of time points for beam searching opportunities. The timing for performing beam searching could be defined in terms of a frame number, a subframe, or other types of number to describe time units. Each of the one or more assigned beam search sequences could be, for example, a random access preamble (RAP) the same or similar to the set currently used in a LTE communication system. The physical resources for UEs to perform beam searching could be, for example, the same or same, similar, or different from physical resource assignment used in the physical random access channel (PRACH) configuration currently used in a LTE communication system.

The SBS and Macro BS would be able to differentiate among different UEs and their beam configurations. To accomplish this, the SBS and the Macro BS may use a mapping table which maps between particular sequences or physical resources to UE IDs and beam configurations. In other word, a specific physical resource could be mapped to a UE and its beam configuration. However, if the sequence can inherently carry UE information, then a mapping table would not be required. In the exemplary embodiment, the random access channel (RACH) resource allocation scheme could be the same or similar to the LTE handover scheduled RACH preamble transmission which is not a contention based RACH transmission.

In step S504, the UE and the one or more SBSs may start coordinated beam searching. Each UE may scan for beams from multiple SBSs simultaneously. Each SBS and each UE may use T timeslots to complete one iteration of beam search. (This does not only include the method that SBSs and UEs are scanning). Each SBS would record the quality of every successfully received sequence from all UEs and the corresponding beam configurations between each UE and SBS. In step S505, each SBS would transmit a report which contains information about receives sequences and their corresponding signal qualities to the Macro BS in order for the Macro BS to make a handover decision. In step S506, the Macro BS would determine which SBS would serve the UE as the UE will be handed over to the SBS target or may remain with the same SBS. The Macro BS may select for each UE more than one SBS if necessary.

Figure 6:
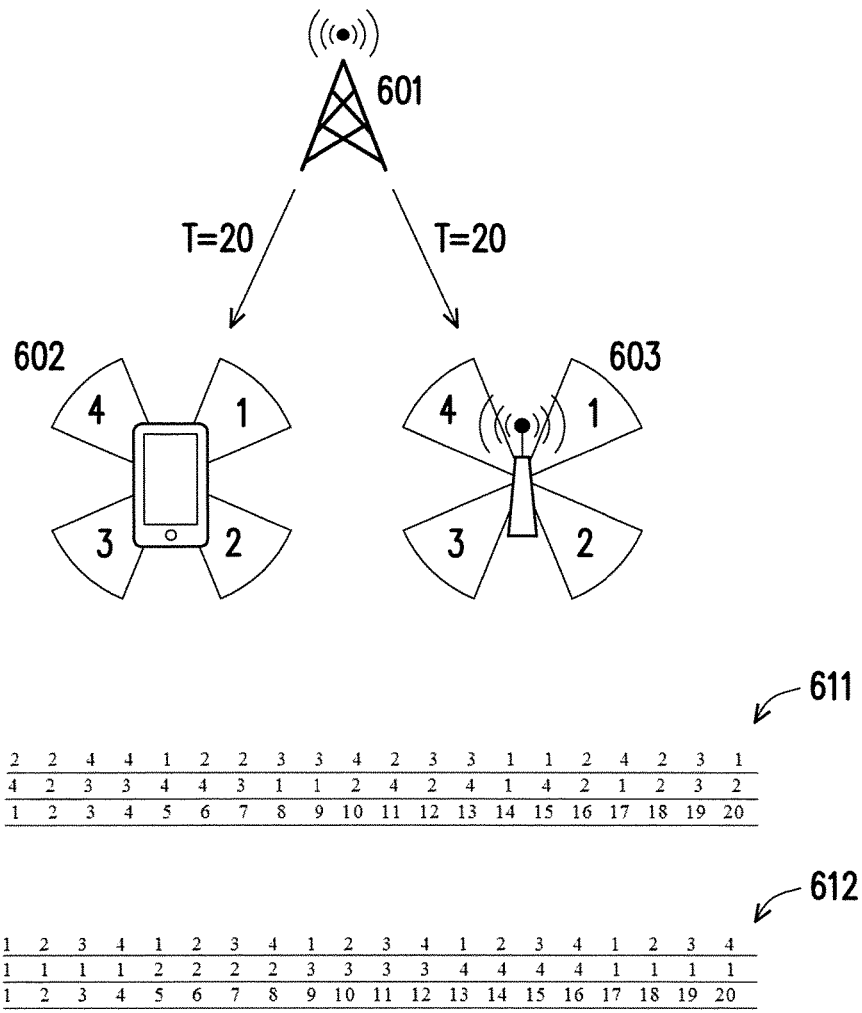
FIG. 6 illustrates an example of a first stage of the mobility management method in accordance with one of the exemplary embodiment of the disclosure.

FIG. 6 illustrates an example of a first stage of the mobility management method in accordance with one of the exemplary embodiment of the disclosure. In this example, it is assumed that a UE 602 and a SBS 603 are under the domain of a Macro (master) BS 601. Both the UE 602 and the SBS 603 are assumed to have 4 antenna beams with each antenna beam labeled from 1 to 4 in FIG. 6 as each antenna beam transmits at a different direction. It is also assumed that the Macro BS 601 in a SBS Searching Configuration message (e.g. S503) has announced that the next beam search duration is 20 timeslots. Each of the UE and the SBS may independently determine which antenna beam sequence is to be used for transmission in the 20 time slots. In first table 611 which illustrates a random selection scheme, both the UE and the SBS are determined to have a random antenna beam sequence. For example, in the first 5 time slots, the UE would transmit by using beams with beam IDs 2 2 4 4 1 respectively; in the first 5 slots, the SBS would transmit by using beams with beam ID 4 2 3 3 4 respectively. The pattern would continue in a random manner. In second table 612 which illustrates a sequential search scheme, both the UE and the SBS are determined to have a sequential antenna beam sequence. For example, in the first 5 time slots, the UE would transmit by using beams with beam IDs 1 2 3 4 1 respectively; in the first 5 slots, the SBS would transmit by using beams with beam ID 1 1 1 1 2 respectively. The pattern would continue in a sequential manner. However, it should be noted that the disclosure is not limited to these two types of transmission sequences as an ordinary person skilled in the art may devise other transmission schemes.

Figure 7:
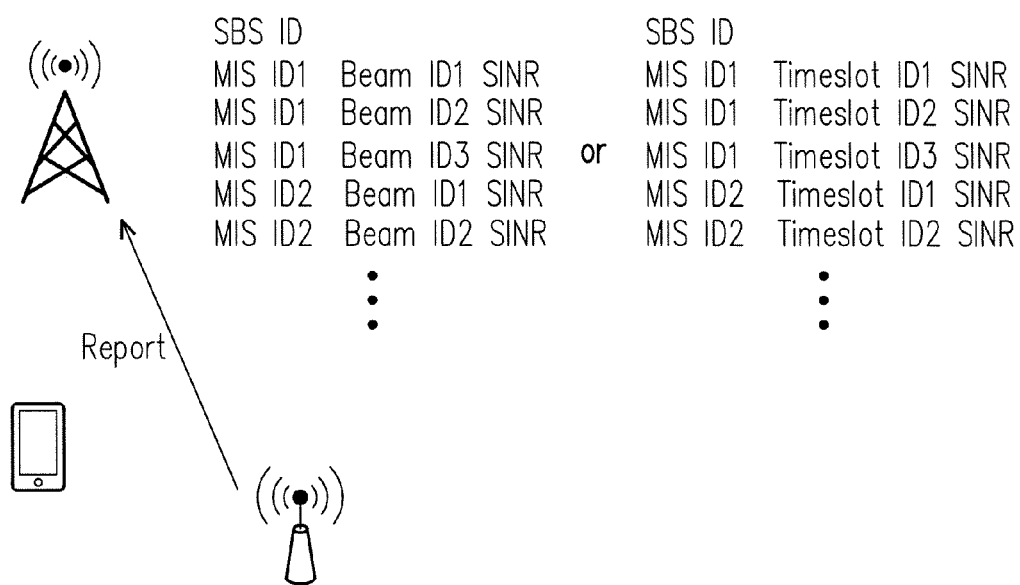
FIG. 7 illustrates an example of a first stage of the mobility management method in accordance with one of the exemplary embodiment of the disclosure.

FIG. 7 illustrates an example of a first stage of the mobility management method in accordance with one of the exemplary embodiment of the disclosure. In this example, a SBS would record the received sequences and their corresponding signal qualities and transmit the received sequences and their corresponding signal qualities as a report to a Macro BS. If the received signal of a particular sequence is too weak, the sequence could be discarded. Also if a signal of a particular portion of a sequence, the data of the portion could be discarded. An example of such report is shown in FIG. 7.

The report may contain a SBS ID 701 which identifies the identity of the SBS transmitting to the report. The report may contain beam information such as a column of UE IDs 702, a column of beam IDs 703, and a column of SINR 704 so that each UE could be identified by its UE ID which corresponds to one or more beam IDs. A SINR could be recorded for each beam ID. Alternatively, assuming that a beam ID could not be successfully detected, the report may instead record time slot IDs 705 instead of beam IDs 703. Thus, in this exemplary embodiment, a RACH sequence would either be UE specifically assigned or UE+beam specifically assigned.

Figure 8:
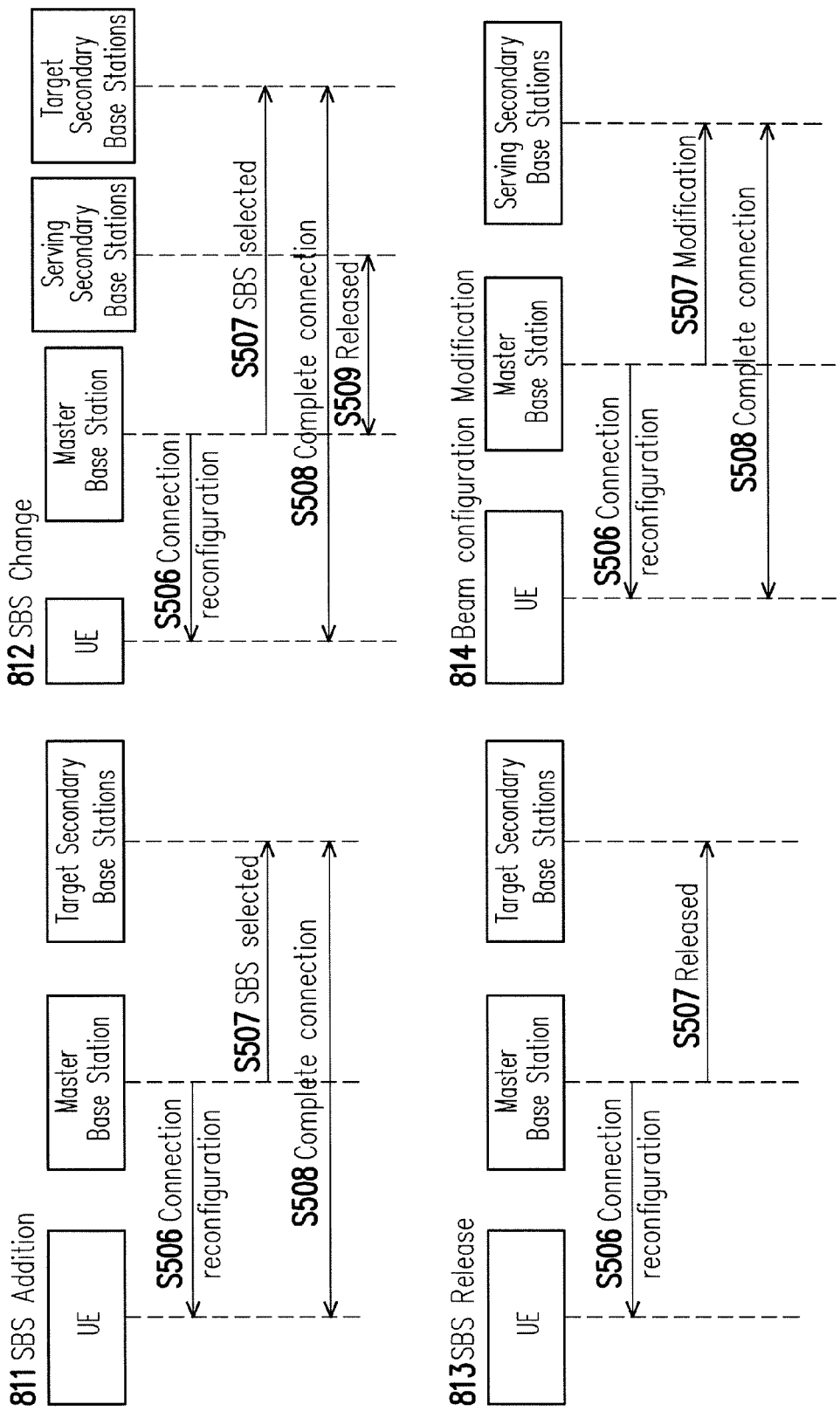
FIG. 8 illustrates a signal diagram of a second stage of the mobility management method in accordance with one of the exemplary embodiment of the disclosure.

FIG. 8 illustrates a signal diagram of a second stage of the mobility management method in accordance with one of the exemplary embodiment of the disclosure. The second stage of the mobility management method may involve one or more signaling mechanisms including a SBS addition mechanism 811 for a UE to add an additional SBS, a SBS change mechanism 812 for a UE to change the serving SBS, a SBS release mechanism 813 for a UE to release a serving SBS, and a beam configuration modification 814 for a UE to modify the current beam configuration. Each of the signaling mechanisms are elucidated in further details.

For the SBS addition mechanism 811, in step S506, the Macro (master) BS would transmit a connection reconfiguration message to a UE. The connection reconfiguration message may include not limited to a beam configuration information and information of the SBS to be added. Subsequent to the reception of the searching report of step S505, the Macro BS would inform the UE the best beam ID which would be included in the beam configuration information. The configuration information would inform the UE which beam ID was the most successful or result in the best signaling quality received by a SBS. In one exemplary embodiment, the beam configuration information may only contain the best beam ID instead of all received beam IDS and their corresponding signal quality measurements (e.g. SINR). The information of the SBS to be added may contain an ID of the target SBS. In step S507, the Macro BS may transmit a SBS selected message to the target SBS. The SBS selected message would inform the target SBS that it will be the serving SBS which will provide a wireless service to the UE (in conjunction with other SBS(s)). However, if no SBS is to be selected, this step could be skipped. In step S508, a connection signaling will be exchanged among the Macro BS, the UE, and the target SBS to complete the configuration of the SBS addition. This step may include synchronization among the Macro BS, the UE, and the target SBS and the subsequent data forwarding or transmission.

For the SBS change mechanism 812, in step S506, the Macro (master) BS would transmit a connection reconfiguration message to a UE. The connection reconfiguration message may include not limited to a beam configuration information and information of the SBS to be added. Subsequent to the reception of the searching report of step S505, the Macro BS would inform the UE the best beam ID which would be included in the beam configuration information. The configuration information would inform the UE which beam ID was the most successful or result in the best signaling quality received by a SBS. In one exemplary embodiment, the beam configuration information may only contain the best beam ID instead of all received beam IDS and their corresponding signal quality measurements (e.g. SINR). The beam that corresponds to the best beam ID would be used for the subsequent transmission with the SBS. The information of the SBS to be added may contain an ID of the target SBS. In step S507, the Macro BS may transmit a SBS selected message to the target SBS. The SBS selected message would inform the target SBS that, instead of the serving SBS, it will be the new serving SBS which will provide a wireless service to the UE (in conjunction with other SBS(s)). The UE will then be handed over to the target SBS. In step S508, a connection signaling will be exchanged among the Macro BS, the UE, and the target SBS to complete the configuration of the SBS addition. This step may include synchronization among the Macro BS, the UE, and the target SBS and the subsequent data forwarding or transmission. In step S509, the Macro BS will transmit a message to release the serving SBS for the service of the UE. The release message of step S506 may release the serving SBS from a SBS service group if such service group exists.

For the SBS release mechanism 813, in step S506, the Macro BS will transmit to the UE a connection reconfiguration message which would include information to release the connection between the UE and the serving SBS. The connection reconfiguration message or a subsequent message may reconfigure the UE to a conventional cellular communication scheme if necessary. In step S507, the Macro BS will transmit a message to release the serving SBS for the service of the UE. The release message of step S506 may release the serving SBS from a SBS service group if such service group exists.

The beam configuration modification mechanism 814 would be executed if, for example, beam tracking has failed during a radio link recovery. The beam configuration modification mechanism 814 would be executed mostly for indicating a new beam configuration (e.g. a different beam indicated by its beam ID is needed for future transmissions). For the beam configuration modification mechanism 814, in step S506, the Macro (master) BS would transmit a connection reconfiguration message to a UE. The connection reconfiguration message may include not limited to a beam configuration information and information of the SBS to be added. Subsequent to the reception of the searching report of step S505, the Macro BS would inform the UE the best beam ID which would be included in the beam configuration information. The configuration information would inform the UE which beam ID was the most successful or result in the best signaling quality received by a SBS. In one exemplary embodiment, the beam configuration information may only contain the best beam ID instead of all received beam IDS and their corresponding signal quality measurements (e.g. SINR). The beam that corresponds to the best beam ID would be used for the subsequent transmission with the SBS. The information of the SBS to be added may contain an ID of the target SBS. In step S507, the Macro BS would transmit a SBS selected message to the serving base station. However, since this mechanism does not actually add or change the serving SBS, the selected SBS will be the same as the current serving SBS. Under such circumstance, the serving SBS would know that the current beam configuration will be modified and no change or addition of serving SBS will occur. In step S508, a connection signaling will be exchanged among the Macro BS, the UE, and the target SBS to complete the configuration of the SBS addition. This step may include synchronization among the Macro BS, the UE, and the target SBS and the subsequent data forwarding or transmission.

Figure 9A:
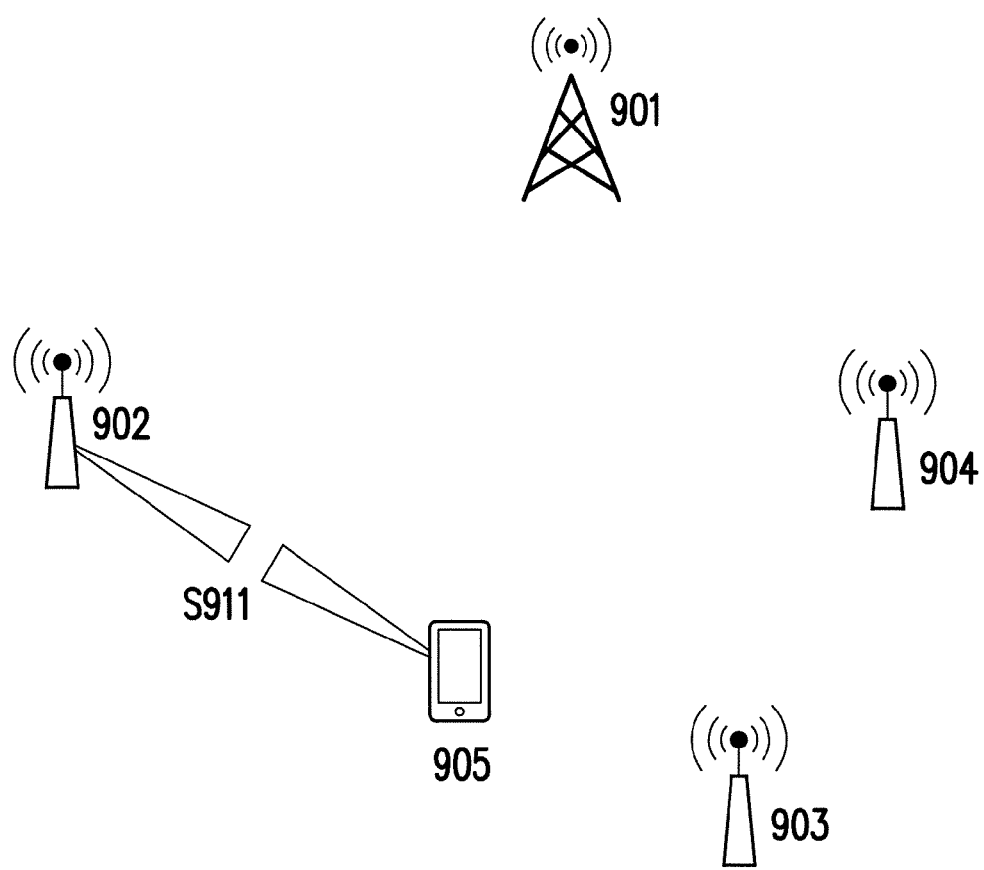
FIG. 9A illustrates an example of implementing a connection change to a secondary base station in accordance with one of the exemplary embodiment of the disclosure.

FIG. 9A~FIG. 9E provides a concrete example of a radio access network performing a SBS change. The radio access network in this example would include a Macro (master) BS, multiple SBSs 902 903 904, and a UE 905. Referring to FIG. 9A, in step S911, the connection between the UE 905 and the SBS 902 is assumed to be getting worse. The connection between the UE 905 and the SBS 902 could be a mmWave connection while the connection between the UE 905 and the Macro BS could be a legacy RF connection which is currently being used in a LTE communication system. A UE (e.g. 905) may typically perform signal quality measurements of a connection or link with its serving secondary base station (e.g. 902). If the signal quality measurement is determined to be below a predetermined threshold, the procedures of FIG. 9B~FIG. 9E will be triggered. In these procedures, the Macro BS 901 will may determine whether to change the current serving SBS of the UE 905 from the SBS 902 to a different SBS or may determine to change the current beam configuration of the UE 905 and/or the SBS 902.

Figure 9B:
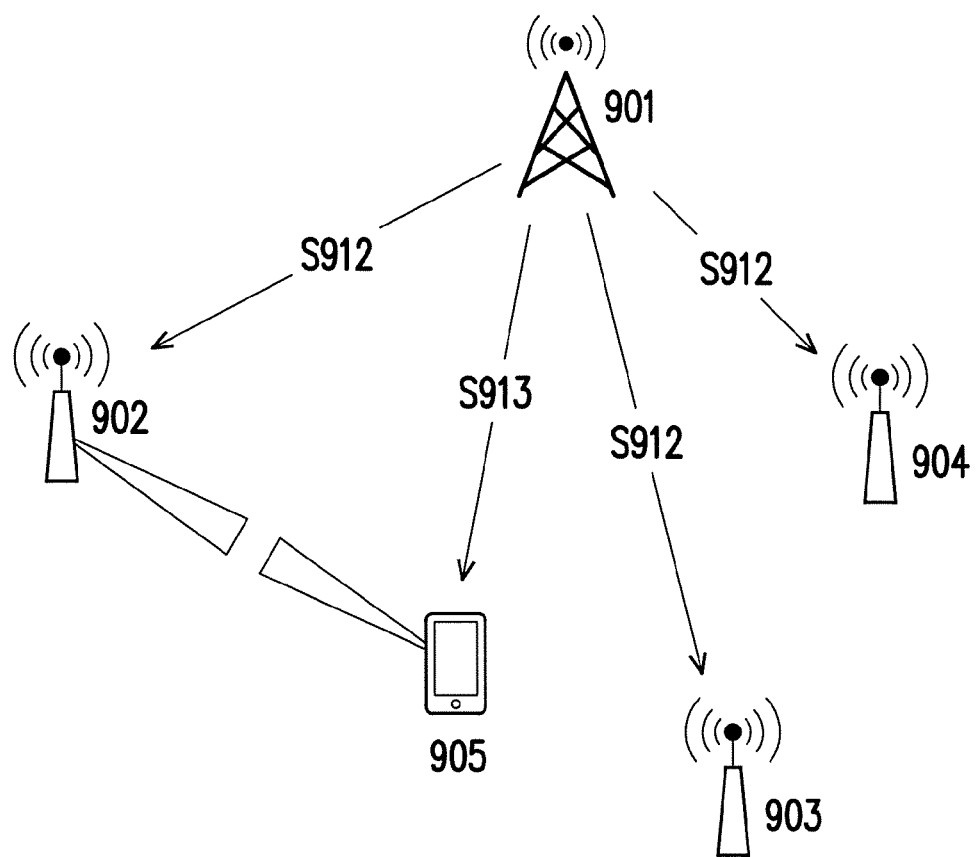
FIG. 9B illustrates the continuation of the example of FIG. 9A in accordance with one of the exemplary embodiment of the disclosure.
Figure 9C:
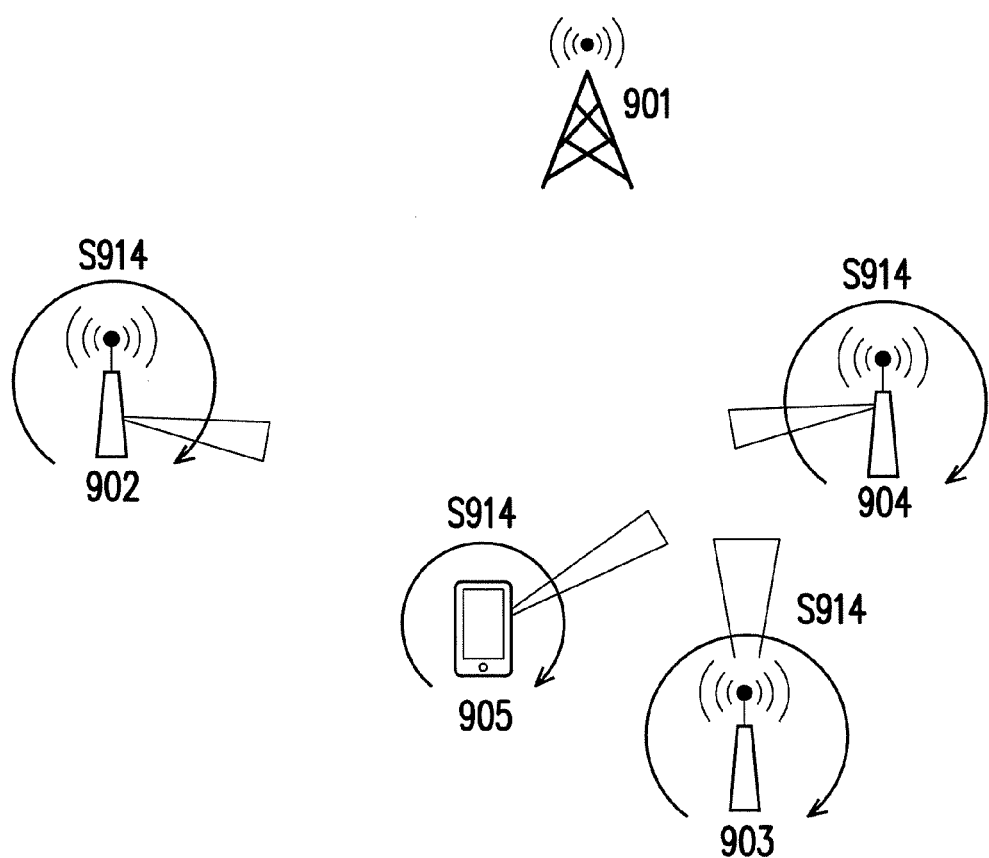
FIG. 9C illustrates the continuation of the example of FIG. 9B in accordance with one of the exemplary embodiment of the disclosure.
Figure 9D:
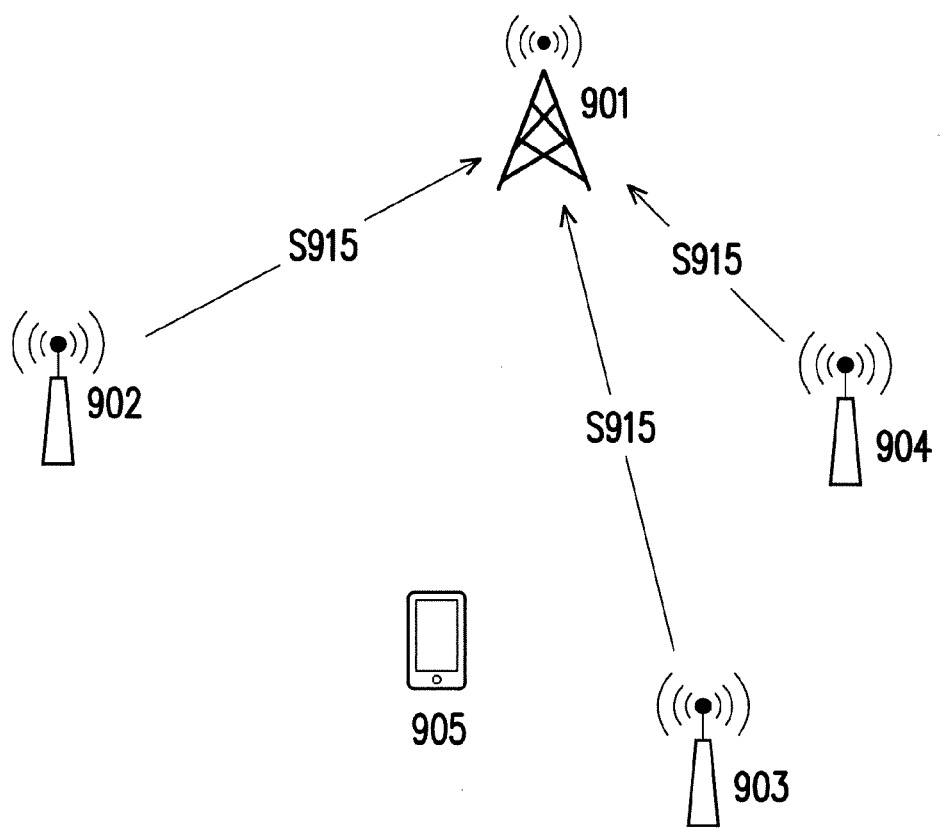
FIG. 9D illustrates the continuation of the example of FIG. 9C in accordance with one of the exemplary embodiment of the disclosure.
Figure 9E:
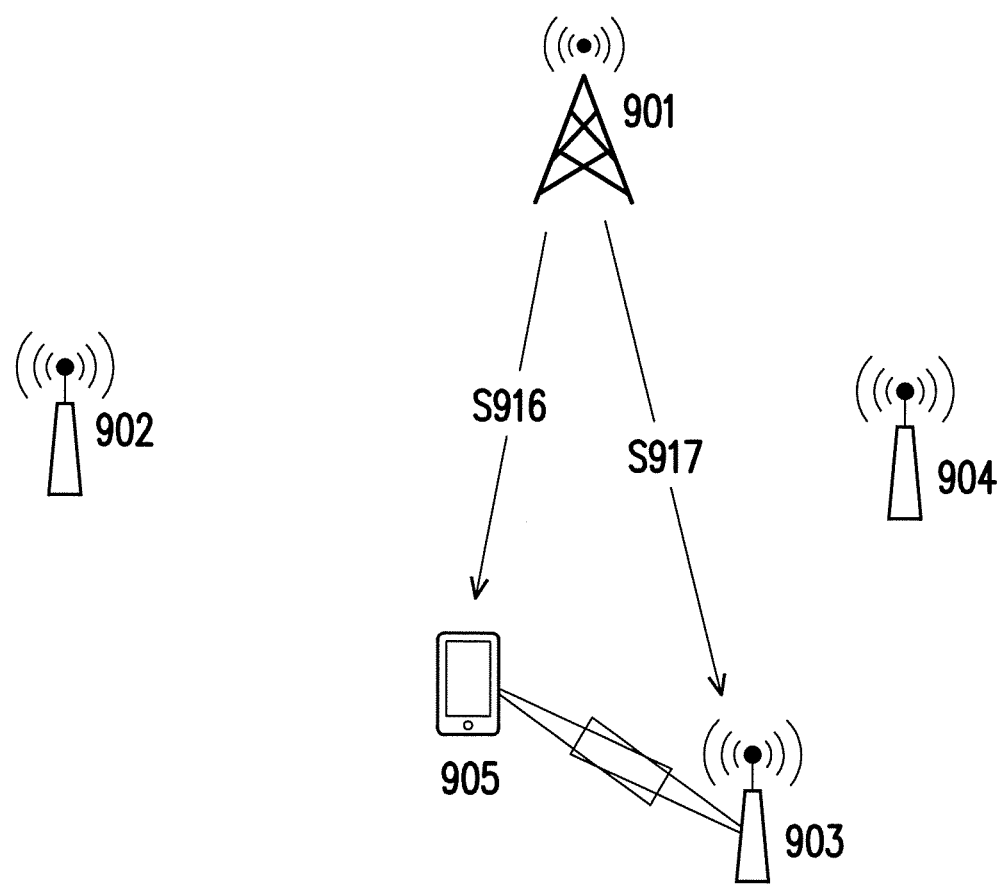
FIG. 9E illustrates the continuation of the example of FIG. 9D in accordance with one of the exemplary embodiment of the disclosure.

Referring to FIG. 9B, in step S912, the Macro BS 901 would transmit a searching requests to each of the SBSs 902 903 904 under which the UE 905 may potentially be in communication with. Also the Macro BS would transmit a random access preamble to the UE 905. Referring to FIG. 9C, in step S914, each of the SBSs 902 903 904 may perform a beam search on a RACH by performing a signal quality measurement of each scan beam of the UE. Also, the UE 905 perform a beam search on a RACH by performing a signal quality measurement of each scan beam of the SBSs 902 903 904. Referring to FIG. 9D, in step S915, the SBSs would transmit a report which contains not limited to the signal quality measurement of each scan beam of the UE to the Macro BS 901. Based on the report, the Macro BS 901 would determine one or more of the optimal SBSs for serving the UE 905 and/or the best beam configuration of the UE and/or of the SBS to communicate with one another. Referring to FIG. 9E, it is assumed that the Macro BS 901 has determined the SBS 903 to be the optimal SBS for communicating with the UE 905. In step S916, the Macro BS 901 would reconfigure the UE 905 by implementing the SBS change mechanism 812 to change the serving SBS of the UE 905 from SBS 902 to SBS 903. In step S917, the same SBS change mechanism 812 would also be applied to change the serving SBS of the UE 905 to SBS 903.

Alternative to the aforementioned exemplary embodiment, the coordination of the mobility management method could be performed by another type of base station within a radio access network or by a network entity within a core network instead of the Macro (master) BS. Also alternatively, the functions of a SBS could be performed by a transmission reception point (TRP) which is capable of directional communications in the mmWave frequency.

The above described mobility management method to change the serving SBS of a UE or to change the beam configurable of the UE could be triggered by these following events not limited to: poor measurement results submitted by a wireless device (e.g. below certain threshold), a missing measurement result, a measurement result during a time period (e.g. TTT), a trigger event similar to the current LTE dual connectivity handover, a high data transmission error rate, a radio link failure (e.g. RLF condition similar to LTE RLF), and an error or failure event in beam tracking. For example, in the dual connectivity architecture, if a radio link failure in an mmWave link has detected, the Macro BS and UE could still use control signaling over a lower frequency link to trigger the disclosed mobility management method. For another example, if a UE is missing one or more beam reference signal receptions, and a UE may send a report to the network to trigger the disclosed mobility management method.

In view of the aforementioned descriptions, the present disclosure is suitable for being used in a mmWave wireless communication system which deploys directional antennas and is able to discover the optimal secondary base station to communicate with a user equipment and to arrange an optimal connection between the secondary base station and the user equipment by configuring the optimal beam configuration.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mobility management method applicable to a user equipment (UE) in a macro-assisted communication system, the method comprising:
   receiving a small cell base station (SBS) searching configuration message which comprises a duration parameter of T timeslots;
   performing a first beam search of a SBS over the T timeslots in response to receiving the SBS searching configuration message, comprising:
      performing a signal quality measurement for each SBS beam ID over the T timeslots;
      transmitting a scan beam having a different UE beam ID over each time slot of the T timeslots;
   measuring a beam quality of a first wireless connection;
   receiving a preamble in response to the beam quality being below a threshold;
   performing a second beam search on a random access channel in response to receiving the preamble;
   transmitting a measurement report which comprises a result of the second beam search; and
   receiving a connection change information for the first wireless connection in response to transmitting the measurement report.

2. The method of claim 1, wherein receiving the connection change information for the first wireless connection comprising:
   receiving a connection reconfiguration message which comprises a beam identification (ID) and a secondary base station ID; and
   adding a second wireless connection with a secondary base station which corresponds to the secondary base station ID.

3. The method of claim 1, wherein receiving the connection change information for the first wireless connection comprising:
   receiving a connection reconfiguration message which comprises a beam identification (ID) and a secondary base station ID;
   adding a second wireless connection with a secondary base station which corresponds to the secondary base station ID; and
   severing the first wireless connection.

4. The method of claim 1, wherein receiving the connection change information for the first wireless connection comprising:
   receiving a connection reconfiguration message;
   severing the first wireless connection in response to receiving the connection reconfiguration message; and
   configuring a cellular connection with a macro cell base station.

5. The method of claim 1, wherein receiving the connection change information for the first wireless connection comprising:
   receiving a connection reconfiguration message which comprises a beam identification (ID) and a secondary base station ID which is a current serving secondary base station ID; and
   changing the first wireless connection to have another beam configuration which is based on the beam ID.

6. The method of claim 1, wherein the small cell base station (SBS) searching configuration message further comprises one or more of:
   a starting time information of performing the signal quality measurement;
   an ending time information of performing the signal quality measurement; and
   a plurality of time point information of performing the signal quality measurement.

7. The method of claim 2, wherein the first wireless connection and the second wireless connection are in the millimeter wave frequency range.

8. The method of claim 7, wherein a third wireless connection which operates in a radio frequency (RF) range is established with a macro cell base station.

9. A user equipment comprising:
   a transmitter;
   a receiver; and
   a processor coupled to the transmitter and the receiver and configured to:
   receive, via the receiver, a small cell base station (SBS) searching configuration message which comprises a duration parameter of T timeslots;
   perform a first beam search of a SBS over the T timeslots in response to receiving the SBS searching configuration message, comprising:
      perform a signal quality measurement for each SBS beam ID over the T timeslots;
      transmit a scan beam having a different UE beam ID over each time slot of the T timeslots;
   measure a beam quality of a first wireless connection;
   receive, via the receiver, a preamble in response to the beam quality being below a threshold;
   perform, via the receiver, a second beam search on a random access channel in response to receiving the preamble;
   transmit, via the transmitter, a measurement report which comprises a result of the second beam search; and
   receive, via the receiver, a handover information from the first wireless connection to a second wireless connection in response to transmitting the measurement report.

* * * * *